United States Patent [19]

Flora

[11] Patent Number: 4,803,655
[45] Date of Patent: Feb. 7, 1989

[54] DATA PROCESSING SYSTEM EMPLOYING A PLURALITY OF RAPIDLY SWITCHABLE PAGES FOR PROVIDING DATA TRANSFER BETWEEN MODULES

[75] Inventor: Laurence P. Flora, Covina, Calif.

[73] Assignee: Unisys Corp., Detroit, Mich.

[21] Appl. No.: 139,074

[22] Filed: Dec. 28, 1987

Related U.S. Application Data

[63] Continuation of Ser. No. 327,626, Dec. 4, 1981, abandoned.

[51] Int. Cl.⁴ .............................................. G06F 9/00
[52] U.S. Cl. ..................................................... 364/900
[58] Field of Search ................................. 364/200, 900

[56] References Cited

U.S. PATENT DOCUMENTS

| | | | |
|---|---|---|---|
| 3,848,234 | 11/1974 | MacDonald | 364/200 |
| 4,065,809 | 12/1977 | Matsumoto | 364/200 |
| 4,084,230 | 4/1978 | Matick | 364/200 |
| 4,124,891 | 11/1978 | Weller, III et al. | 364/200 |
| 4,136,385 | 1/1979 | Gannon et al. | 364/200 |
| 4,136,386 | 1/1979 | Annunziata et al. | 364/200 |
| 4,158,227 | 6/1979 | Baxter eet al. | 364/200 |
| 4,164,787 | 8/1979 | Aranguren | 364/200 |
| 4,173,783 | 11/1979 | Couleur et al. | 364/200 |
| 4,177,510 | 12/1979 | Appell et al. | 364/200 |
| 4,325,116 | 4/1982 | Kranz et al. | 364/200 |
| 4,443,847 | 4/1984 | Bradley et al. | 364/200 |
| 4,481,570 | 11/1984 | Wiker | 364/200 |

Primary Examiner—Gareth D. Shaw
Assistant Examiner—John Gladstone Mills
Attorney, Agent, or Firm—Nathan Cass; Kevin R. Peterson

[57] ABSTRACT

An execute module in a data processing system is provided with a randomly accessible scratchpad memory which is logically divided into two switchable pages. During operation one page can be written with new instruction data from a fetch module while a previously written page is concurrently being read by the execute module for execution of a designated data processing operation. When the execute module completes execution and requires a new block of data, the two pages are logically switched by toggling an address bit.

8 Claims, 3 Drawing Sheets

DATA PROCESSING SYSTEM EMPLOYING A PLURALITY OF RAPIDLY SWITCHABLE PAGES FOR PROVIDING DATA TRANSFER BETWEEN MODULES

This application is a continuation of application Ser. No. 327,626, filed Dec. 4, 1981, now abandoned.

BACKGROUND OF THE INVENTION

This invention relates generally to data processing apparatus and, more particularly, to improved apparatus and methods for enhancing the performance of data processing operations.

In many types of data processing systems, each task is divided into several smaller pieces to permit concurrent performance of the task by several smaller data processors or modules. Although this approach permits each of these smaller data processing modules to be optimized for performance of its particular portion of the task, the transferring of the partially completed task between modules For example, a typical way of implementing data transfers between modules in a system such as described above is to provide input and output scratchpad queues for each module so as to permit data to be asynchronously transferred between modules. In such an implementation, a sending module places data to be transferred in its output queue and then forgets about it. The output queue asynchronously transfers the data to the receiving module's input queue when it is available to receive the data. Then, when the receiving module requires the transferred data, it simply reads the data from its input queue. Although the use of input and output queues in this manner solves the problem of having to synchronize module operations, it has the disadvantage that the queue structure is expensive and also involves considerable overhead.

Of course, a more direct way of implementing data transfers between modules is to simply provide sufficient wiring between modules so that data can be directly transferred therebetween with little or no overhead penalty. However, such an approach not only requires a large and expensive interconnection structure, but also requires that the data be in registers rather than in more cost-effective scratchpads.

SUMMARY OF THE INVENTION

Accordingly, it is a broad object of the present invention to provide improved apparatus and methods for transferring data between units in a data processing system.

A more specific object of the invention is to provide economical apparatus and methods for transferring data between data processing modules in a data processing system in a manner which significantly reduces the transfer overhead.

Another object of the invention is to provide for transferring data between units in a data processing system using a relatively simple and economical interconnection arrangement.

An additional object of the invention is to provide for transferring data between units in a data processing system wherein the data to be transferred resides entirely in scratchpad memories.

The above objects are accomplished in a preferred embodiment of a data processing system in accordance with the invention by providing a receiving module with a scratchpad memory which is logically divided into two switchable pages. During operation, one page can be written by a sending module while the other page is being read by the receiving module. Each page is randomly addressable by the corresponding module so that the sending module need not send the data in any particular order, and the receiving module need not spend any time in transferring the data from one place to another. When the receiving module is finished with a page it is reading and requires a new block of data available in the other page (as a result of being written by a sending module), the two pages are logically switched. This is accomplished without any transfer of data. Instead, all that is required is that an address bit be toggled so that the pages addressed by the sending and receiving modules are effectively switched. Thus, in essentially zero time (the time required to toggle the address bit which is extremely fast), an entirely new block of data is caused to appear in the receiving module's addressable page. The transfer overhead is thereby substantially eliminated without the need of any expensive queue structure, since the data may reside entirely in economical scratchpad memory chips.

The specific nature of the invention as well as other objects, uses, features and advantages thereof will become evident from the following description of a preferred embodiment taken in conjunction with the accompanying drawings.

DETAILED DESCRIPTION OF THE INVENTION

Like numerals and characters designate like elements throughout the figures of the drawings.

Figure 1:
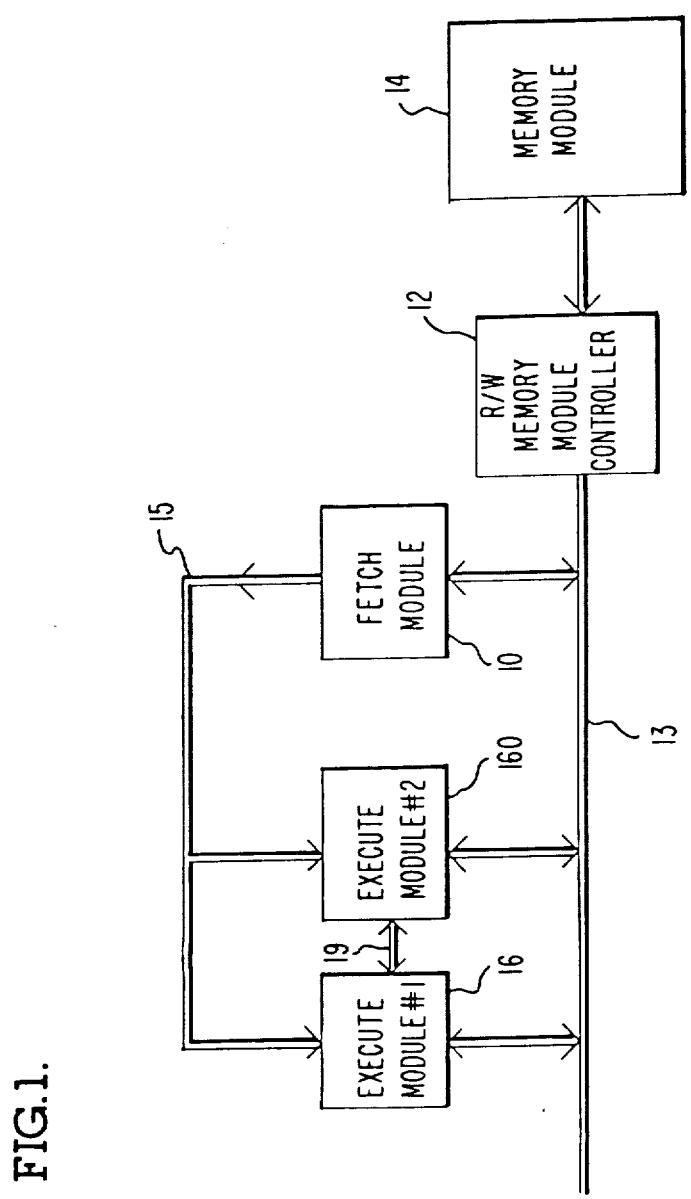
FIG. 1 is an overall block diagram illustrating a plurality of cooperating data processing modules which may advantageously incorporate the present invention.

Referring initially to FIG. 1, illustrated therein is a block diagram of a plurality of cooperating data processing modules which may advantageously incorporate the present invention. As indicated in FIG. 1, a fetch module 10 cooperates with a read/write memory controller module 12 to access instructions from a memory module 14 via bus 13 for application to one or more execute modules (such as modules 16 and 116) via bus 15. Signals required between the execute modules 16 and 116 are applied via lines 19. Data involved in the data processing operations to be performed is transferred between the memory controller 12 and the respective fetch and execute modules 10, 16 and 116 also via bus 13.

More specifically, the fetch module 10 is specially designed to resolve the field lengths and addresses of the retrieved instructions prior to sending to the execute modules 16 and 116. Each of the execute modules 16 and 116 is specially designed to perform the data processing called for by the applied instructions, and may be configured in either a single or dual configuration. The memory controller module 12 interfaces the fetch module 10 and the execute modules 16 and 116 to the memory module 14.

The present invention will be illustrated as applied to the fetch module 10 and the execute modules 16 and 116 in FIG. 1. For this purpose, attention is now directed to FIG. 2 which is a preferred implementation illustrating the cooperation provided between the fetch module 10 and the execute modules 16 and 116 in accordance with the invention.

Figure 2:
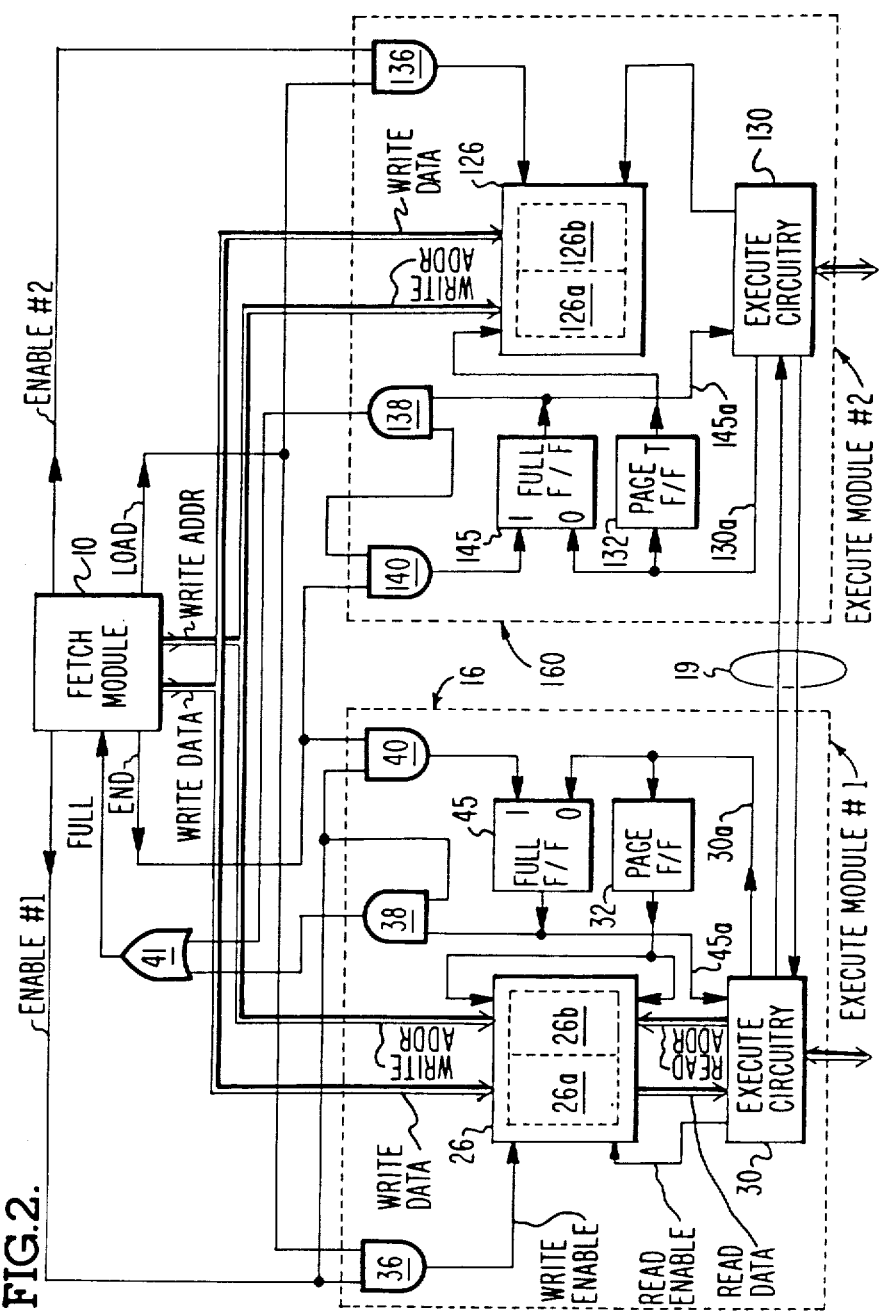
FIG. 2 is a block diagram of a preferred implementation illustrating the cooperation provided between the fetch and execute modules of FIG. 1 in accordance with the invention.

As illustrated in FIG. 2, each of the execute modules 16 and 116 includes a scratchpad random access memory 26 or 126, respectively, each memory 26 and 126 being functionally divided into two pages 26a and 26b and 126a and 126b respectively. As will hereinafter be described in more detail, these two pages in each memory are switchable by their respective execute circuitry 30 or 130 after every instruction so that each page may alternately function as a fetch page to receive instruction data from the fetch module 10 and as an execute page for use by its respective execute circuitry in performing an instruction. Thus, while the execute circuitry 30 or 130 in an execute module is executing an instruction from one page, the fetch module 10 can fill up the other page with the data required for a succeeding instruction.

Furthermore, in the preferred embodiment, the memories 26 and 126 are chosen to be of the random access type and each location in the memory is designated to store a particular portion of the applied instruction data. Thus, the fetch module 10 can send its data to an execute module in any order for writing at appropriate designated addresses in the current fetch page; also, the execute circuitry after switching a fetch page for use as an execute page, can selectively read out the data from the appropriate designated addresses as required for executing the indicated instruction.

Before continuing with the description of FIG. 2, it should be noted that, in order to simplify the description of FIG. 2, references will hereinafter be made primarily to the construction and operation of execute module #1 identified by the numerical 16, which, for the purposes of this description, may be assumed to be identical to execute module #2 identified by the 100-greater numerical designation 116. For ease of comparison, components of execute module #2 are given 100-greater numerical designations than like components in execute module #1. Also, in order to simplify FIG. 2, clock inputs to the various components (which are conventional) are not shown, and should be assumed as provided where required.

Returning to the description of FIG. 2, a page flip-flop 32 is provided whose state is controlled by the execute circuitry 30, and whose output provides one bit of the write address or read address applied to the random access memory 26. The organization of the memory 26 is such that, when the page flip flop 32 is in one state, an applied write address from the fetch module 10 causes accompanying write data to be written at the designated address in a first page of the memory 26, while concurrently permitting an applied read address from the execute circuitry 30 to read out data from the designated address in the other page of the memory. The opposite occurs when the page flip-flop 32 is in its other state—that is, when the page flip-flop is in its second state, an applied write address causes accompanying write data to be written at the designated address in the second page of the memory 26, while an applied read address causes data to be read out from the designated address in the first page of the memory 26. It will thus be evident that the two pages provided in each execute module memory 26 or 126 can be switched merely by switching the respective page flip flop 32 or 132, which can be done very rapidly (for example, in a few nanoseconds).

The construction and operation of the remaining portions of the execute module #1 will become evident from the following consideration of the signals applied between the fetch module 10 and execute module #1 during typical operations. For this purpose, attention is additionally directed to the timing diagram of FIG. 3 which illustrates the timing relationships between the various signals transferred between the fetch and execute modules during typical operation.

Typically, the fetch module 10 sends instructions alternately between execute modules #1 and #2 in order to speed up overall processing time. The required sequencing of instructions is enforced by signals sent via lines 19 between the execute circuitry 30 and 130 of the execute #1 and #2 modules. These signals act to prevent an execute module from changing machine state until the other module has completed execution of a previous instruction. The specific manner in which this is accomplished is not pertinent to the present invention and will thus not be further described; however, it is to be noted that such instruction sequencing control between modules can readily be provided by those skilled in the art.

Figure 3:
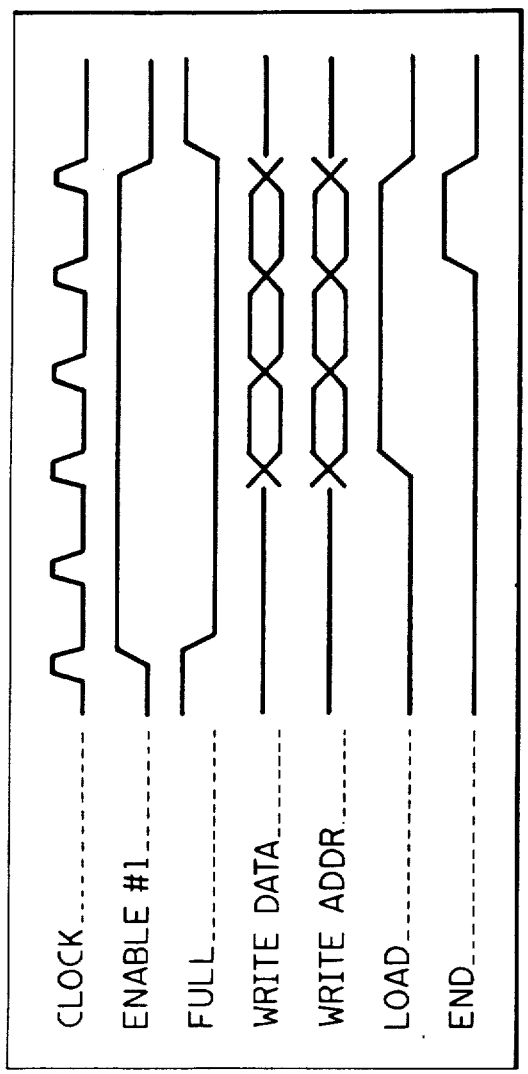
FIG. 3 is a series of timing diagrams illustrating the timing relationships between the various signals transferred between the fetch and execute modules in FIG. 2.

For the purposes of the present description of FIG. 2 using the timing diagrams of FIG. 3, it will be assumed that, during the first clock indicated in the top graph in FIG. 3, the ENABLE #1 signal illustrated in the second graph in FIG. 3 becomes "1" (positive) which enables execute module #1 by enabling AND gates 36, 38 and 40. The enabling of AND gate 38 causes the current state of a full flip-flop 45 to be applied via an OR gate 41 to the fetch module 10 as a FULL signal, as illustrated in the third graph in FIG. 3. The state of the full flip-flop 45 and thus the enabled FULL signal indicates whether the enabled execute module #1 is ready to receive new instruction data—that is, whether the execute circuitry 30 has completed execution of its previous instruction and switched to the other page. The execute circuitry 30 manifests this instruction completion by applying, via output line 30a, a "1" signal to the page flip flop 32 to switch the page in memory 26, while also applying this "1" signal to the full flip-flop 45 to switch its output to a "0" to indicate that the current fetch page is now available to receive new instruction data.

It will also be assumed that, when the fetch module 10 sends the ENABLE #1 signal to the execute module #1, the previous instruction has been completed so that the execute circuitry 30 will have switched to the next page and will have reset the full flip-flop 45 to the "0" state to indicate that the execute module #1 is ready to receive new instruction data. Thus, when the applied ENABLE #1 signal from the fetch module 10 enables AND gate 38 (along with AND gates 36 and 40), a "0" FULL signal is received by the fetch module 10, which is indicated in FIG. 3 by the FULL signal going negative. This "0" FULL signal permits the fetch module 10 to load a data word into execute module #1. This is accomplished by the fetch module 10 sending out to execute module #1 a LOAD signal along with a DATA word and an accompanying WRITE ADDRESS. The LOAD signal is applied, via AND gate 36 (which remains enabled by the ENABLE #1 signal) for use as a write enable signal for writing the transmitted DATA word into the memory 26 at the accompanying WRITE ADDRESS in the page designated by the output of the page flip-flop 32. As indicated in FIG. 3, the fetch module 10 can send a new DATA word and a different accompanying WRITE ADDRESS at each succeeding clock which will be written in memory 26 in a like manner.

When the fetch module 10 sends its last DATA word and accompanying WRITE ADDRESS, it also sends a "1" END signal to the execute #1 module. This "1" END signal passes, via AND gate 40 (which remains enabled by the ENABLE #1 signal) to the "1" input of the full flip-flop 45 to switch it to a "1" state to thereby indicate that the current page is full. At the next clock following the END signal (which is the last clock shown in FIG. 3), the ENABLE #1 and LOAD signals return to "0", while the ENABLE #2 signal becomes "1"; the FULL signal applied to the fetch module 10 thus now represents the status of the FULL flip-flop 145 on execute module #2. As pointed out previously, the full flip-flop 45 or 145 remains in a "1" state until its respective execute module #1 or #2 completes its previous instruction and switches the pages.

So far, it has been described how the fetch module 10 sends data words to specified addresses of the current fetch page, that is, the page designated by the page flip-flop 32 for storing data sent by the fetch module. While the fetch module 10 is writing into the current fetch page, the execute circuitry 30 is able to concurrently and selectively read out instruction data words stored in the other (or execute) page designated by the page flip flop 32, as required in order to execute the indicated instruction. This is readily accomplished since the execute circuitry 30 need merely provide a read enable signal and READ ADDRESS to the memory 26 for each data word to be read out. Each applied READ ADDRESS in conjunction with the output from the page flip-flop 32 will then read out the selected READ DATA word from the designated address in the execute page. When the instruction is completed and the full flip-flop is "1", the execute circuitry 30 switches the state of the page flip-flop 32 to switch the pages and also resets the full flip-flop 45 to "0" to permit the next instruction data to be sent from the fetch module 10. Also, when the execute circuitry 30 completes an instruction, it sends a signal via one of lines 19 to the execute circuitry 130 of the execute module #2 for use in enforcing the proper sequencing of instructions.

Although this description has been directed to a particular illustrative embodiment of the invention, it is to be understood that the invention is subject to a wide variety of possible modifications and variations in construction, arrangement and use without departing from the true scope and spirit of the invention. For example, it is to be understood that the present invention is also applicable for use in a system which employs multiple execute modules, wherein each module performs only a part of an overall job and then passes the job on to the next module. Accordingly, the present invention is to be considered as encompassing all possible apparatus and methods coming within the scope of the invention defined by the appended claims.

What is claimed is:

1. In a data processing system, the combination comprising:

a memory containing instructions;

a fetch module for retrieving instructions from said memory and for preparing instruction data required for execution; and an execute module for performing data processing operations in response to instruction data applied thereto from said fetch module;

said execution module including a randomly addressable read/write scratch pad memory having a plurality of logically switchable pages operable to permit said execute module to randomly read instruction data from one of said pages for the performance of a data processing operation while concurrently permitting said fetch module to randomly write instruction data required for use in a subsequent data processing operation into a different one of said pages;

said execute means being operable to provide for logical page switching without any transfer of data therebetween in a manner such that, after said execute module has completed data processing with respect to instruction data read from one page, the pages are logically switched so that another page can be randomly read by said execute module while said one page becomes available to have new instruction data randomly written therein by said fetch module;

said execute module being operable following said switching to signal said fetch module that a page is available in said scratch pad memory for receiving new instruction data.

2. The invention in accordance with claim 1, wherein said read/write scratch pad memory includes means for concurrently reading and writing in a plurality of pages at different randomly selectable addresses thereof in response to read and write addresses respectively applied by said execute module and said fetch module.

3. The invention in accordance with claim 2, wherein said execute module includes means for producing page address data for use in performing said logical page switching, wherein said page address data is combined with said read address and said write address to form a composite read address and a composite write address such that said page address data determines the particular pages in which reading and writing are to occur and said write address provided by said fetch module determines the address location within the page selected by said page address data for writing and said read address provided by said execute module determines the address location within the page selected by said page address data for reading.

4. The invention in accordance with claim 3, including a second execute module for alternately receiving instruction data from said fetch module.

5. The invention in accordance with claim 3, wherein said execute module provides for switching said pages by changing the value of said page address data.

6. The invention in accordance with claim 4, wherein said second execution module also includes means for signalling said fetch module that a page is available in its scratch pad memory for receiving new instruction data.

7. The invention in accordance with claim 4, wherein said execute modules include means for signalling one another with regard to the status of data processing performed thereby.

8. The invention in accordance with claim 1, 2, 3, 4, 5, 6, or 7, wherein said page address data comprises a predetermined number of bits, and wherein said execute module provides for switching said pages by changing the values of said bits.

* * * * *

UNITED STATES PATENT AND TRADEMARK OFFICE
CERTIFICATE OF CORRECTION

PATENT NO. : 4,803,655
DATED : February 7, 1989
INVENTOR(S) : Laurence P. Flora

It is certified that error appears in the above-identified patent and that said Letters Patent is hereby corrected as shown below:

Col. 1, line 22, after "modules" insert --can involve considerable overhead--.

Signed and Sealed this

Twenty-seventh Day of June, 1989

Attest:

DONALD J. QUIGG

*Attesting Officer*    *Commissioner of Patents and Trademarks*